Figure 1:
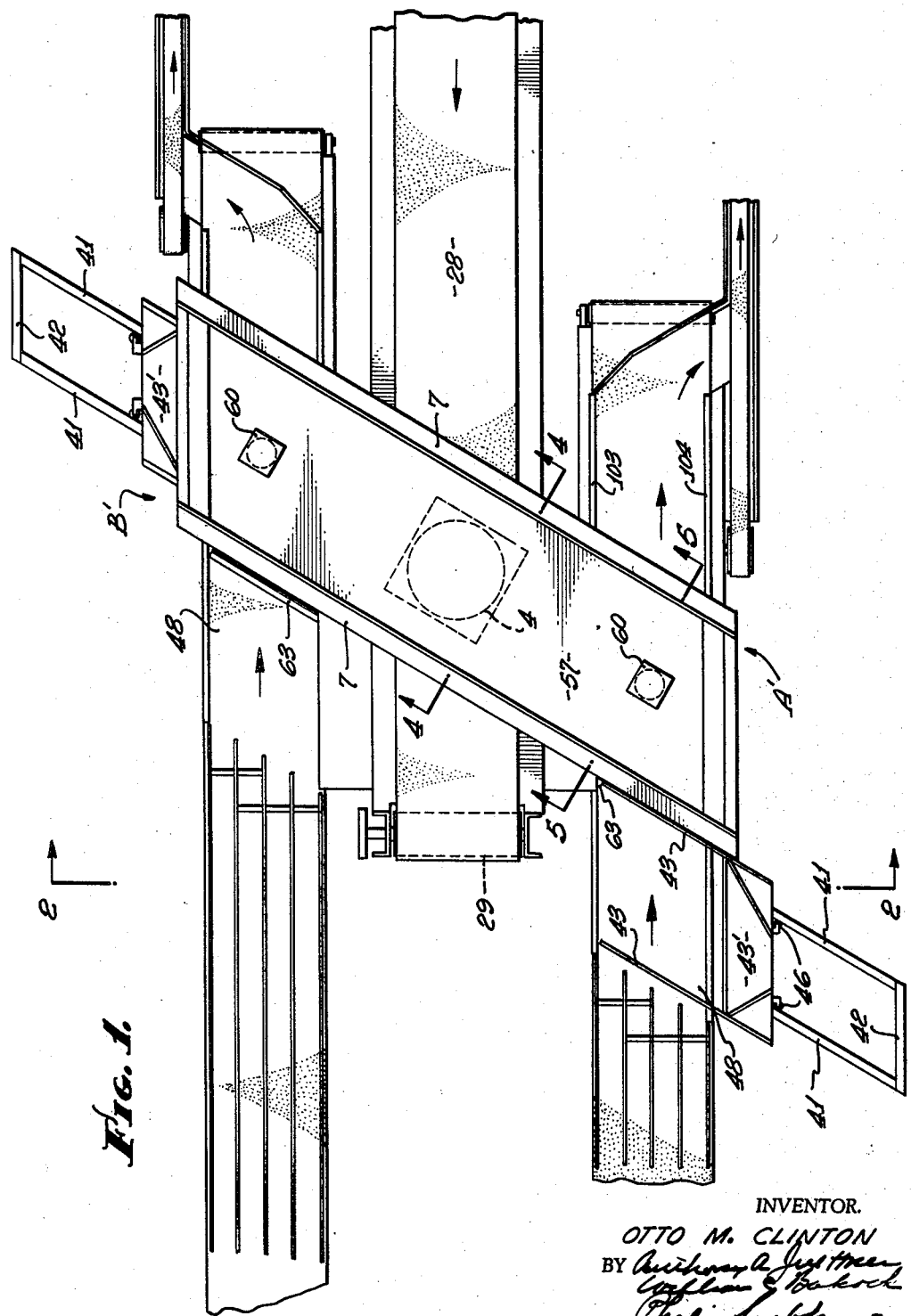

June 21, 1960     O. M. CLINTON     2,941,341
DOUGH CUTTING AND CAN FILLING MACHINE
Filed Feb. 17, 1958     9 Sheets-Sheet 2

INVENTOR.
OTTO M. CLINTON
ATTORNEY.

June 21, 1960  O. M. CLINTON  2,941,341
DOUGH CUTTING AND CAN FILLING MACHINE
Filed Feb. 17, 1958  9 Sheets-Sheet 3

INVENTOR.
OTTO M. CLINTON
BY
ATTORNEY.

June 21, 1960   O. M. CLINTON   2,941,341
DOUGH CUTTING AND CAN FILLING MACHINE
Filed Feb. 17, 1958   9 Sheets-Sheet 4
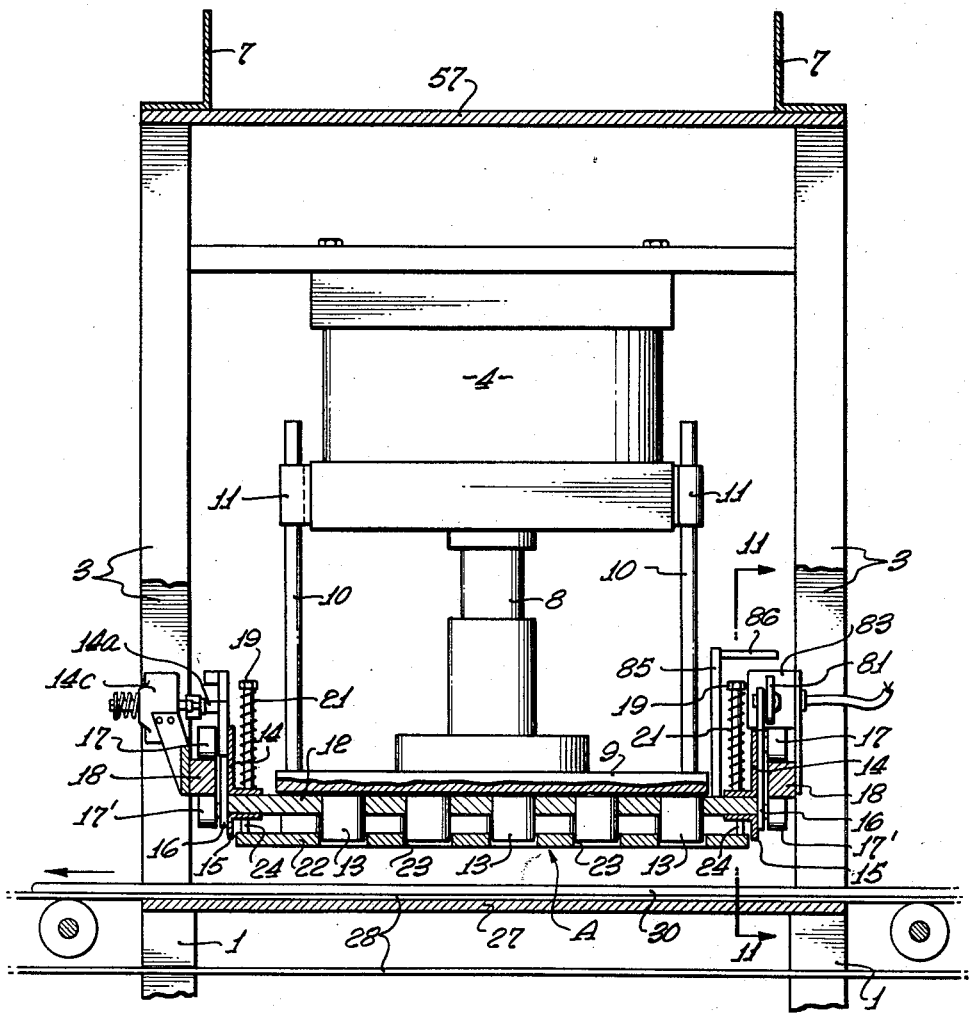
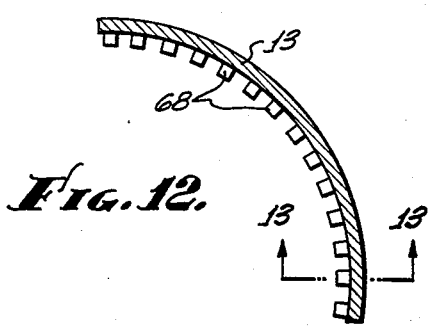
INVENTOR.
OTTO M. CLINTON
ATTORNEY.

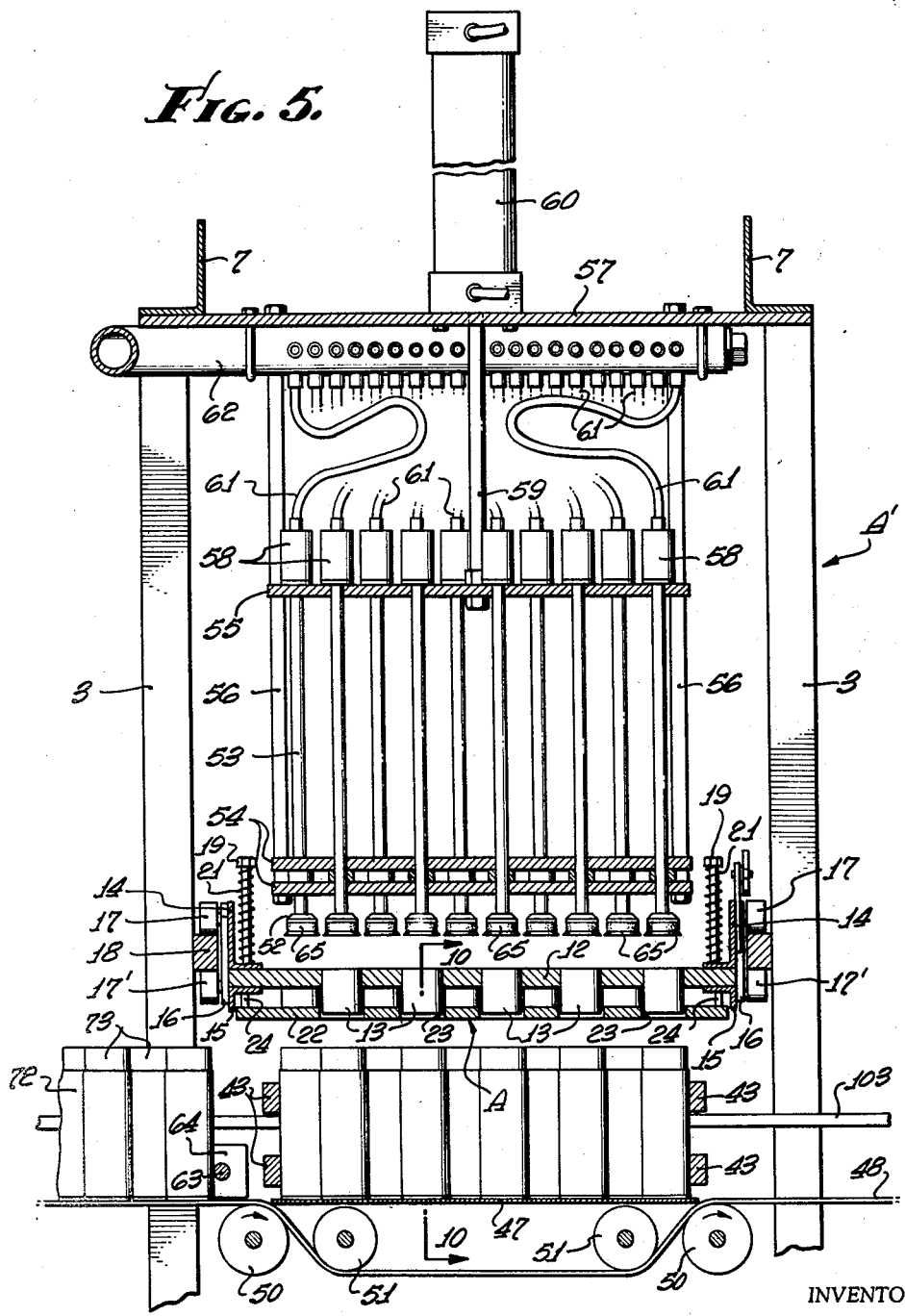

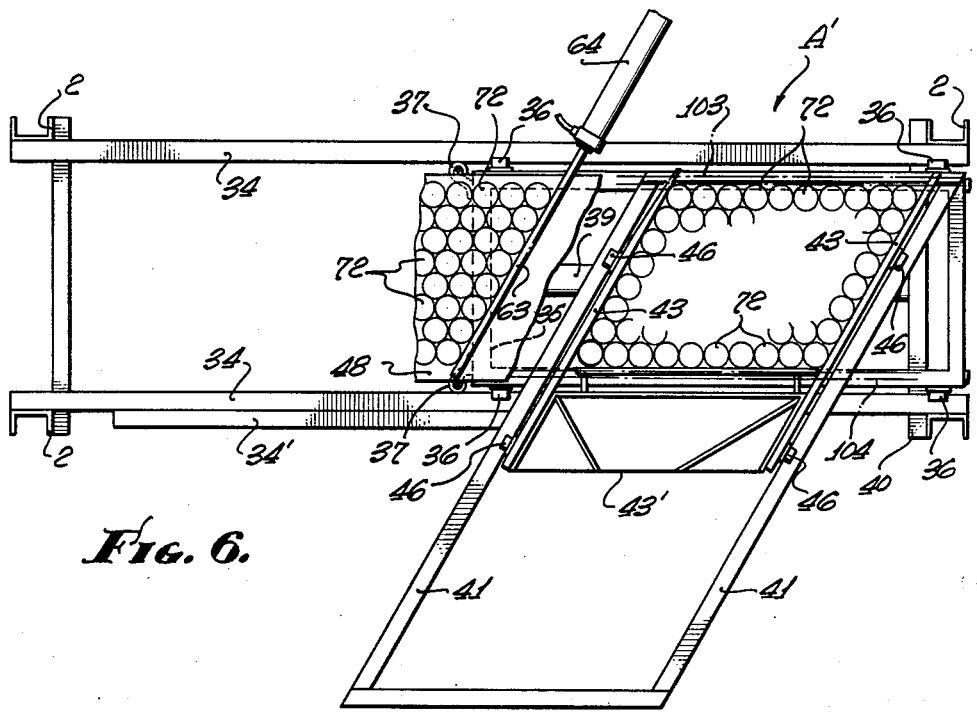
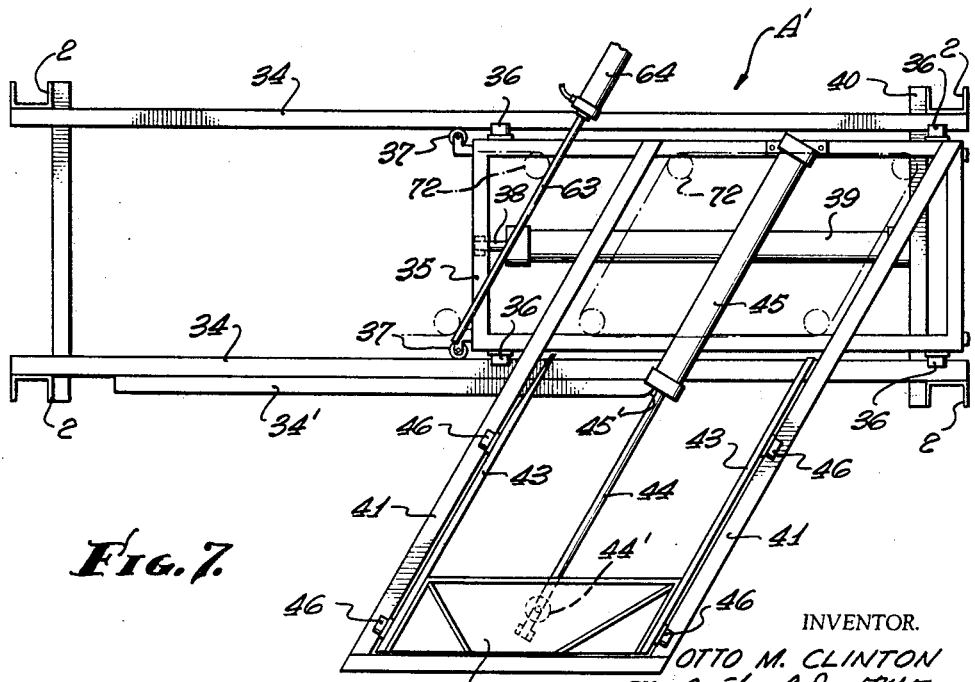

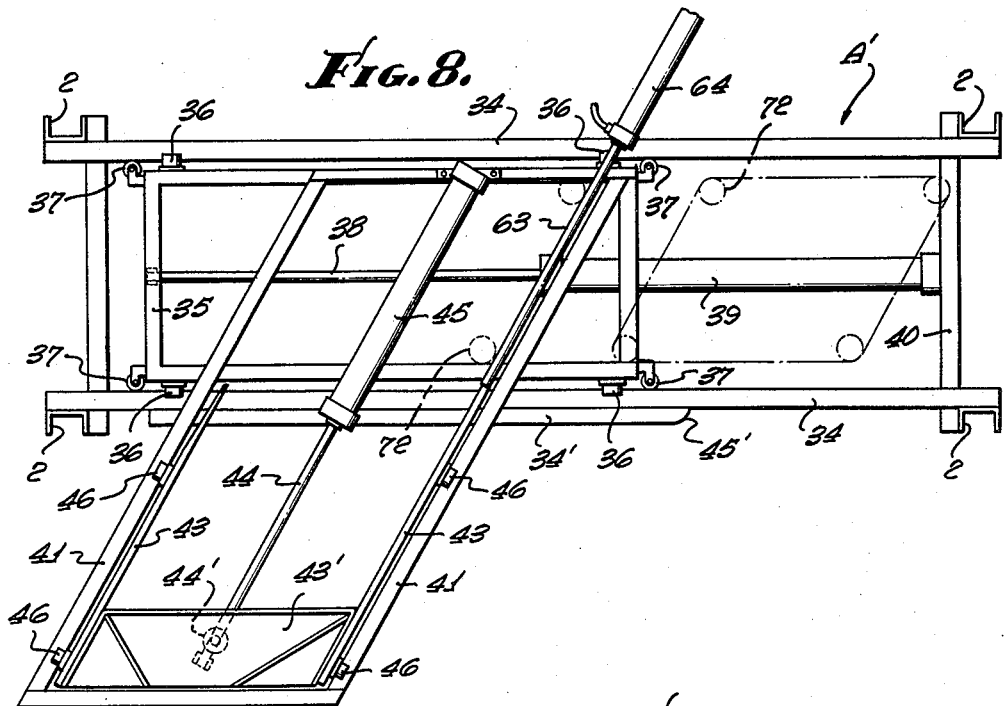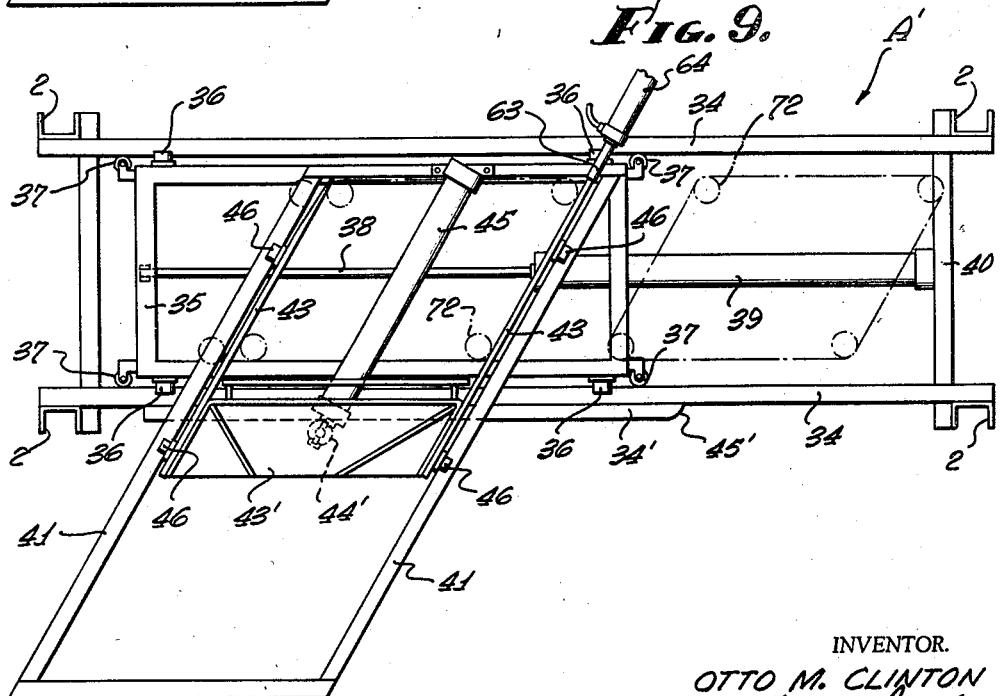

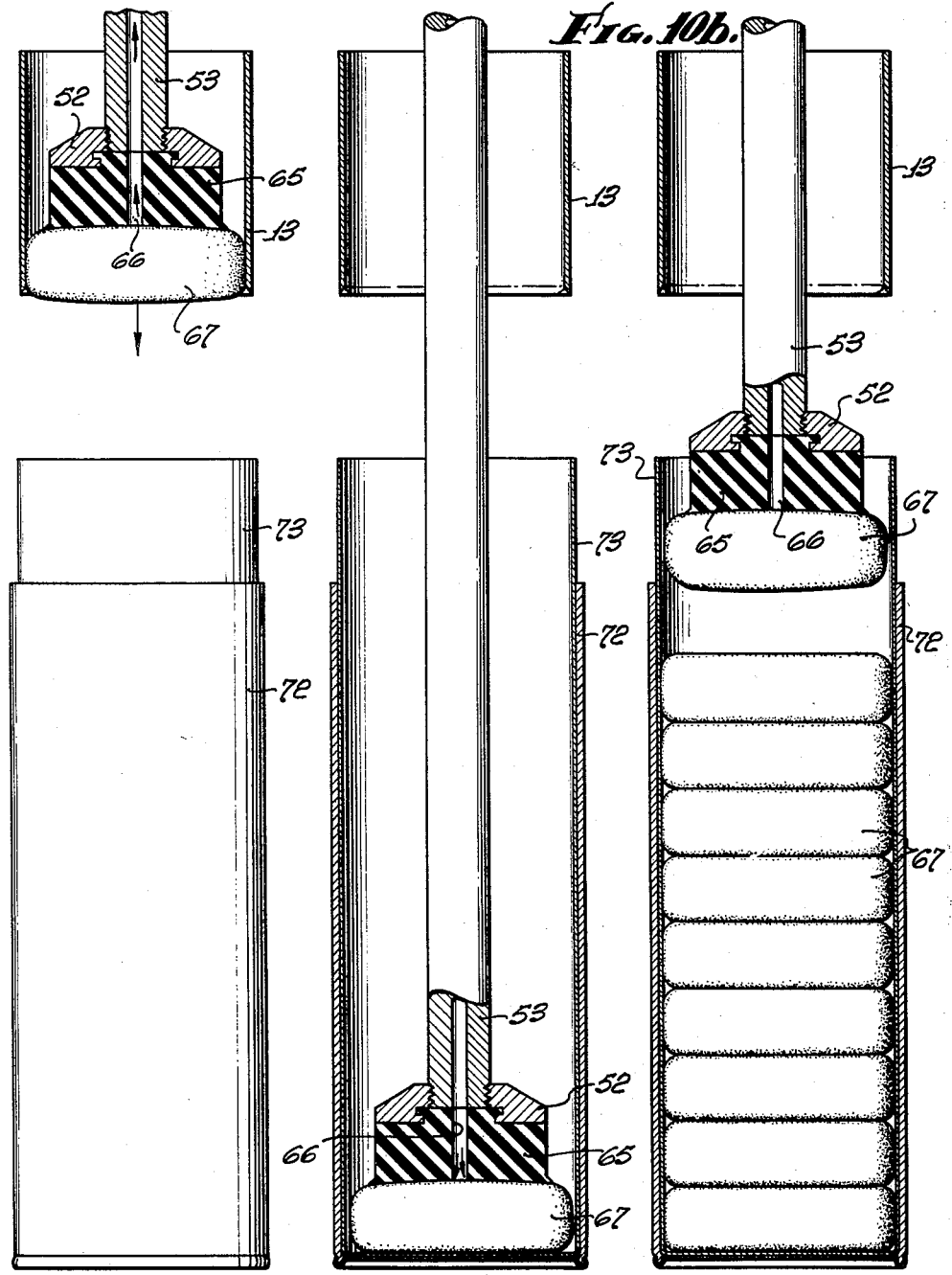

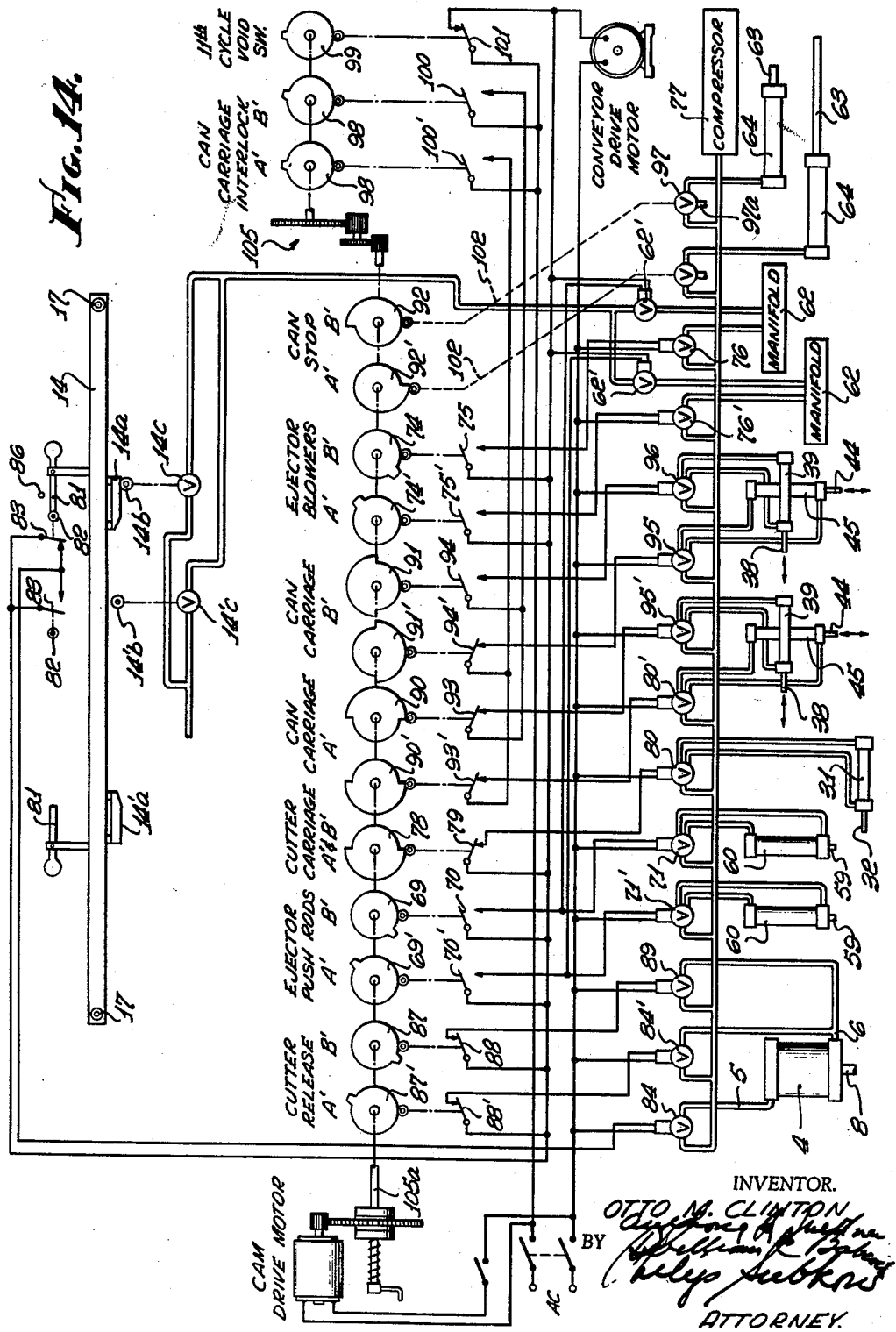

United States Patent Office 2,941,341
Patented June 21, 1960

2,941,341
DOUGH CUTTING AND CAN FILLING MACHINE

Otto M. Clinton, Glendale, Calif., assignor to General Mills, Inc., Minneapolis, Minn., a corporation of Delaware Filed Feb. 17, 1958, Ser. No. 715,586

13 Claims. (Cl. 53—123)

This invention relates to a machine for stamping sections from sheet material and for packaging such stampings.

While it may be adapted to many types of sheet material and stampings of various geometric forms, it has a particular utility in the packaging of dough. Dough ready for baking has previously been stamped and packaged by various hand and automated machines. One well known service is in the packaging of prepared biscuit doughs. Reference may be made to my U.S. Patents Nos. 2,623,479 and 2,803,175 describing one device for cutting dough wafers from a sheet of dough and to the preparation of cans containing liners for hand filling of such dough wafers into prepared cans.

I have invented an automated machine for cutting and filling such lined cans to provide for improved cutting and filling of cans.

In the machine of my invention, a cutter assembly is designed to cut a group of wafers arranged in rows and files from an advancing sheet of dough, and to transport the wafers to a filling station, in which a group of cans are similarly arranged. The wafers are brought into registry, one wafer over a corresponding can. Means are provided whereby the wafers are introduced into the cans and then the cutter assembly returns to the cutting station in cycles of operation, to cut a new section of the advancing sheet of dough.

As one of the useful features of my invention, the cutters are designed to stamp out the geometric shape desired, and on arrival of the cutters at the filling station means are provided whereby the stampings are removed from the cutters and introduced into the corresponding cans.

Additionally, the wafers may be introduced without tilting in the cans, thus assuring filling without error or interruption of the filling operation due to jamming.

Means are also provided for repeating the cycle of cutting and filling to introduce the desired number of stampings into the cans.

On completion of the filling operation, means are provided whereby the can or group of cans may be removed from the filling station to permit a new can or group of cans to be moved to filling position.

In order to provide for increased rate of production, two filling stations of like character are positioned, one on each side of the stamping station, and two cutter assemblies are provided connected together to translate between the cutting station and the filling station, each filling station functioning as described above. Control means are provided such that while one cutter is at its filling station the other cutter is at the cutting station.

Control means are provided for repeated cycles of operation such that each cutter repeatedly cuts and inserts the desired number of stampings into the cans which remain at the filling station, and the cans when filled are removed to permit a new set of cans to be filled in cycles of operation.

Figure 2:
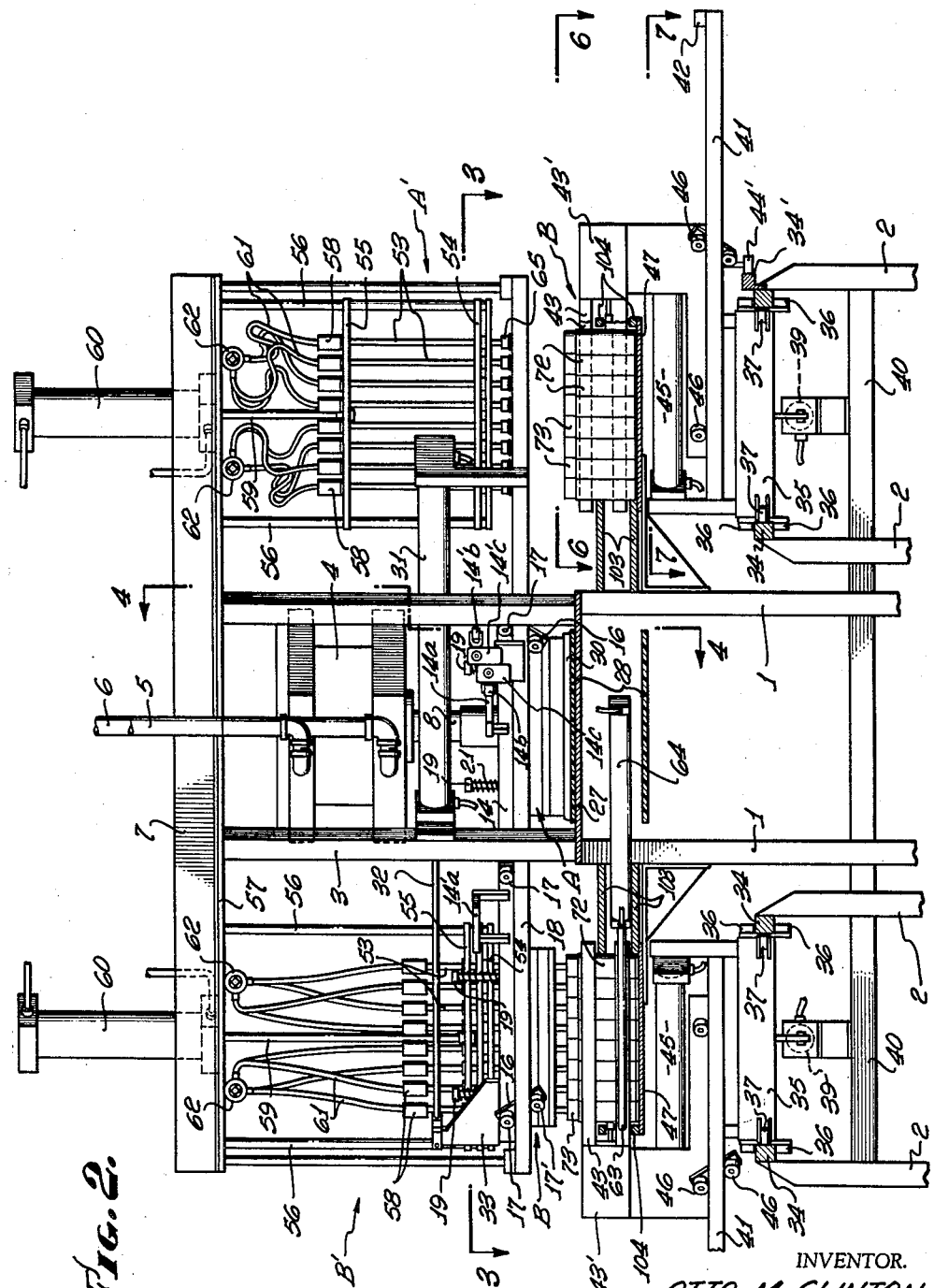
Figure 3:
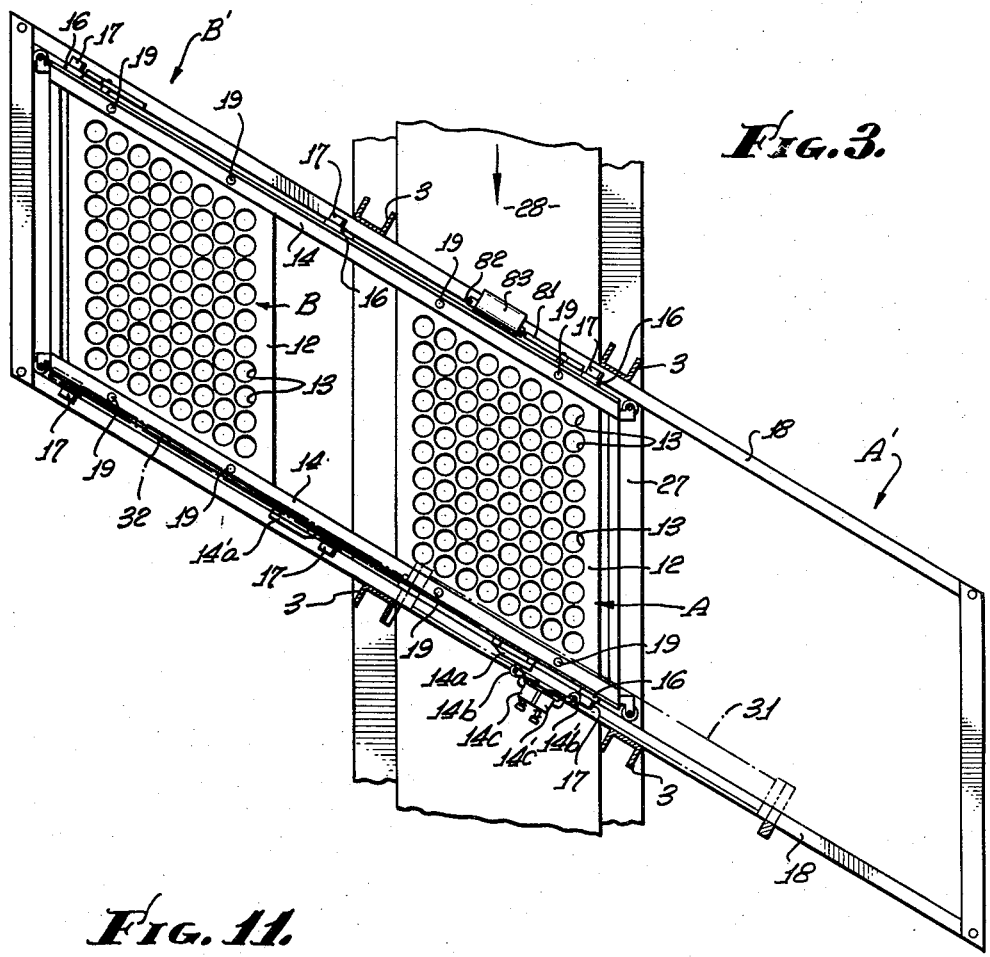
Figure 11:
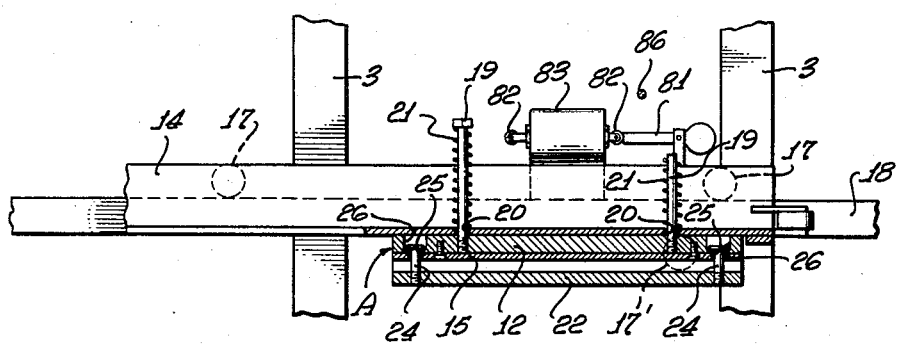

These and other objects of my invention will be further described in connection with the following description of my machine, which is described for the presently preferred use in cutting and packaging biscuit dough. The description is made in connection with the accompanying drawings, in which:

Fig. 1 is a plan view of my machine;
Fig. 2 is a view with parts in section and parts in elevation, taken on line 2—2 of Fig. 1;
Fig. 3 is a section taken on line 3—3 of Fig. 2;
Fig. 4 is a section taken on line 4—4 of Fig. 1 and Fig. 2;
Fig. 5 is a section taken on line 5—5 of Fig. 1;
Fig. 6 is a section taken on line 6—6 of Fig. 2;
Fig. 7 is a section taken on line 7—7 of Fig. 2;
Figs. 8 and 9 are views similar to Fig. 7 showing the mechanism in different stages of operation;
Figs. 10, 10a and 10b are somewhat schematic showings of the filling of the cans at the filling station;
Fig. 11 is a section taken on line 11—11 of Fig. 4;
Fig. 12 is a fragmentary horizontal section of one of the die cutters;
Fig. 13 is a fragmentary section taken on line 13—13 of Fig. 12;
Fig. 14 is a somewhat schematic showing of the arrangement of the automatic controls of the functioning of the machine.

The machine is composed of a die cutting station and two filling stations indicated as B' and A', one on each side of the cutting station. The filling stations are each duplicates of each other, arranged as mirror images, and for this reason all parts are indicated by like numbers. The detailed description herein given for the construction and operation of one of the filling stations will apply also to the other of the filling stations.

Operating between the two filling stations are two cutter assemblies A and B, both of like construction and also mirror images of each other, so related in position that as one is in the packaging position at one of the filling stations, the other cutter assembly is in the cutting position. For this reason the detailed description of the construction and function of one of the cutter assemblies will also apply to the other cutter assembly.

While the machine is described as functioning with two cutters and two packaging stations, it may be operated by deactivating one of the filling stations if the increased rate of production realizable from both stations is not desired, or if desired, only one cutter and filling station, and the other cutter and filling station may be omitted, as will be more fully described below.

Referring to Fig. 2, the machine is mounted on a supporting structure composed of a framework 1 upon which the central or die cutting portion of the machine is mounted and 2 upon which the packaging portion of the machine is mounted. Mounted upon the framework 1 is the die cutting station between posts 3, on which is mounted a power cylinder 4 actuated pneumatically by air passing through pipes 5 and 6, as will be further described. Mounted above the cylinder are diagonally placed beams 7 (see Figs. 1 and 2). Depending from the cylinder 4 is a ram 8 to which is connected a platen 9 guided by rods 10 in a bearing 11 mounted on the cylinder 4. Two die cutting assemblies spaced from each other are mounted on flanges 14 which connect the two assemblies for reciprocation in unison on rails 18, as will be more fully described below. Each assembly includes a die plate 12 carrying hollow die cutters 13 shown as annular but which may be of any desired configuration and arranged in rows and files, as shown in Fig. 3, is connected at the upper surface to an angle 14 on each side of the plate (see Fig. 4) and to an angle 15 on the underneath surface of each side of the plate. The angle 14 is connected to a block 16 (see Figs. 2, 4 and 5) which carries upper and lower rollers 17 and 17' suitably mounted on shafts for rotation and for transport upon the rails 18 which are carried on the posts 3.

Referring to Figs. 4 and 11 it will appear that four studs 19 are threaded into plate 12, one at each corner of the plate. The studs pass through clearance holes 20 in the web of the angle 14. A spring 21 is positioned between the head of the stud 19 and the web of the angle 14. The spring has a diameter sufficiently large so that it does not pass through the clearance holes 20. A stripper plate 22 carrying holes 23 through which the dies 13 pass is mounted beneath plate 12. The plate 22 is hung on studs 24 which pass freely through holes 25 in the web of the angle 15 and in the plate 12, the head being recessed within the recess 26 of the plate 12.

The angles 15 are of a length equal to the corresponding length of the plate 12. The angles 14 extend (see Fig. 3) for a distance sufficient to permit the mounting of a second plate 12 and an associated structure identical to that described in connection with Fig. 4, and is provided with an additional set of rollers 17 and 17' which are mounted on the rails 18, which extend the full length of the structure supported on beams 7 (see Figs. 1, 3 and 4). For purposes of identification, the plate 12, shown to the right in Figs. 2 and 3 will be identified as die cutting station A and the one on the left as B (see Fig. 3). Mounted beneath the stripper plate 22 at the die cutting station A (see Figs. 2 and 4) is a backing plate 27 mounted on the frame 1 (see Fig. 2). An endless belt 28 passes over the plate 27 and between the posts 3 and carries a sheet of dough 30 formed by conventional devices and methods not forming part of this invention. The belt passes over a drive roller 29 and returns underneath the rollers (see Figs. 1, 2 and 4).

Mounted on the rail 18 and the post 3 is a power cylinder 31 (see Figs. 2 and 3, shown in phantom in Fig. 3). The ram 32 of the power cylinder is connected to a gusset 33, which is connected to the ends of the angle 14 at the die plate B (see Figs. 2 and 3). There are thus two die cutters connected for translation back and forth in unison on rails 18 by means of the ram 32, which actuate the cutter carriage assembly composed of the angles 14 and the two cutter assemblies A and B.

There are two packaging stations (see Figs. 1 and 2). As seen in Fig. 2, the packaging station serviced by the die cutter A, and shown to the right in Fig. 2, will be called packaging station A', and the opposite packaging station, shown to the left in Fig. 2, will be called packaging station B'. At each packaging station (see Figs. 6 and 7) is positioned a framework 2 carrying the rails 34 on which is positioned a carriage 35 mounted on rollers 36 and guided by rollers 37 for reciprocation upon the rails 34. The carriage 35 is reciprocated by means of the ram 38 operating in cylinder 39 which is mounted at its rear end upon the cross rail 40 positioned on the frame 2 (see Figs. 7, 8 and 9). Mounted on the carriage 35 is a pair of spaced rails 41 connected by a cross member 42 (see Figs. 6–9). The rails 41 carry a fork 43 composed of two parallel tines connected by a base member 43', to which is connected the ram 44 of the power cylinder 45, the rear end of which is connected to the carriage 35. The fork is reciprocated on rollers 46 which roll on the rails 41 (see Figs. 7, 8 and 9).

Mounted above the cylinder 45 is a plate 47 suitably supported from the frame 1 (see Figs. 2 and 5). An endless belt 48 is mounted to extend parallel to the belt 28, one being provided at each station A' and B'. The belt extends at an elevation equal to that of the plate 47 until it reaches the position of 47 (see Fig. 5), at which time it passes over and under rollers 50 and 51 to pass beneath the plate 47 and then to an elevation parallel to its original position. Positioned immediately in front of the plate 47 and the roller 50 is a ram 63 actuated by a cylinder 64 mounted on the frame 1 (see Figs. 5, 6 and 7). The ram extends parallel to the ram 44 and the rails 41.

Mounted above the plate 47 upon the beams 7 is a can filler mechanism shown in Figs. 1, 2 and 5. The filler mechanism is composed of a plurality of plungers 52 connected to tubes 53 mounted in a frame composed of guide plates 54 and 55 mounted on rods 56 positioned on plate 57 to which the beams 7 are connected. The rods 56 are fixedly connected to the plate 54 but pass through clearance holes, not shown, in plate 55. The tubes 53 pass through clearance holes in the plates 55 and 54 but carry adjustable weights 58 positioned above the plate 55. The plate 55 is connected to the ram 59 actuated by the power cylinder 60 positioned on beams 7. Each of the tubes 53 is connected by a flexible conduit 61 to the manifold 62 (see Fig. 5).

As it appears from Figs. 2, 5 and 10, each of the plungers is composed of a rubber disk 65 carrying a central bore 66 and connected to the plunger head 52 to which the tube 53 is connected. It will be observed that while the belts 48 and 28 are parallel to each other, and that the beams 7, rails 18, the angles 14 and 15, the rails 41 are all parallel to each other, they are all disposed at equal angles to the axis of the belts 28 and 48 and rails 34.

The controls for the machine will appear more fully from the following description of the operation, taken together with the diagram of the controls of Fig. 14. Starting with the machine at the attitude shown in Figs. 1, 2, 3 and 6, the cutter A is shown at the cutting station, while the cutter B is shown at the discharge station B'. As the rails 14 approach the station B', a cam 14a mounted on the side of the rail 14 actuates a cam follower 14b to open a valve 14c to a vacuum, thus placing the manifold 62 at station B under vacuum.

The machine is actuated by a series of controlled pneumatic valves and switches and a series of cams, all mounted on the shaft and driven by a cam drive motor controlled by a series of switches, as shown in Fig. 14. Three sets of cams are mounted on the same cam shaft, one set indicated by primed numbers controlling the operation of cutter assembly A and filling station A', and a like set indicated by unprimed numbers controlling the operation of the cutter assembly B and filling station B'. The cams are so designed that upon a complete rotation of the cam shaft the cutters A and B have each passed through one complete cutting and filling cycle, in which, as will be described below, cutter B is at the filling station B' while cutter A is cutting, and then the cutter A is moved to the filling station A' and the cutter B is cutting, thus completing one cycle of operation. On arrival of the cutter at packaging station B', each die carries a wafer of dough 67 carried in the serrated edges 68 of the die. The attitude of the cams is such that the ejector push rod cam 69 has actuated the switch 70 to open the valve 71 to actuate the ejector cylinder 60 at station B'. The ejector cylinder 60 at station B', actuating the rams 59, lowers the plate 55 to a position determined by the length of the rod 59, switch 70 remaining closed during this period. The closing of switch 70 also actuates the valve 62'. Under this condition of operation a slight vacuum is maintained in manifold 62 and in the tube 53 holding the biscuit in position in the die against 65 (see Fig. 10a). Weights 58 are sufficient to push the wafer out of the die and into the cans, which are positioned in rows and files in registry with the dies 13 of the die plate 12.

The cans, as shown, are in the form of thin-walled tubes closed at the ends, such as paper tubes 72, carrying a liner 73. Reference may be had to U.S. Patents No. 2,623,479 and No. 2,803,175 for a further description of such cans and liners and to an automated device for lining such cans.

At the end of the downward stroke of the ram 59, the cam 69 rides off the cam follower. Valves 71 and 62' close. At the same time the cam 74 actuates the cam follower and valve 76 to introduce pressure into the manifold 62 during the period of the travel of the cup 65 upward in the can to the top of the can. The wafer of dough is thus held on the cup as it is introduced into the can and blown off on withdrawal of the cup irrespective of the number of wafers in the can.

The maintenance of vacuum in the tube 53 assures that the wafer 67 is held in the cup 65 until it is deposited within the tube. This will assure that the wafer does not tilt in the can during insertion, the wafer moving axially of the can until deposited, due to the axial motion of the tube 53. As the cam 69 rides off the cam follower the switch 70 opens, thus directing the air from valve 71 into cylinder 60 to retract the piston rod 59 to elevate the plate 55 to remove the plungers from the can to lift them in the position similar to that shown for station A'. As the plungers are withdrawn from the can, the cutter carriage cam 78 actuates the cam roller to close the switch 79, to open the valve 80, to actuate the cutter carriage cylinder 31, to withdraw the piston rod 32, and thus to translate the cutter plate 12 from the filling station B' to the cutting station. At this point the ram 8 is retracted. The cutters are in the position shown in Fig. 4. During this operation the cutter A has been moved into cutting position and has passed through its cutting operation, as will be more fully described below. After the withdrawal of ram 8 at the completion of the cutting operation by cutter assembly A and during the translation of the cutter assembly B from the filling station B' to the cutting station, the belt 28 has advanced the sheet of dough 30 to present a new dough section under cutter plate 12 of cutter assembly B.

As the rails 14 have been translated to the right to the cutting position, the pivoted arm 81 mounted on 14 contacts the switch actuating element 82 to close the switch 83. This opens the valve 84 to put pressure in the cam ram cylinder 84 to actuate the ram 8 to force the plate 9 against the cutters 13. The plate 12 is pushed down and forces the cutters 13 through the holes 23 in plate 22 and into the dough 30. A slip clutch is provided at pulley 29 and the belt 28 is held stationary so that the dough and the belt are held stationary, while the drive rollers slip to permit the stationary attitude of the dough during the cutting operation. At the same time the studs 19 descend, compressing the springs 21.

The plate 12 carries with it the standard 85 carrying an arm 86 which, as it descends, contacts the arm 81, thus moving the pivoted and weighted arm 81 away from 82, to permit the switch 83 to open and permitting valve 84 to close, and to be maintained closed during the remainder of the operation of B at the cutting station. At the same time the cam 87 has moved into position to actuate the cam followers so as to close the switch 88, to actuate the valve 89, which permits air to enter the cutter ram cylinder 4 to lift the ram 8. As the plate 9 is raised by the ram 8, the springs 21 lift the studs 19 to lift the plate 12 away from the plate 22, until the plate 12 is against the angle 14. The cutters 13 are thus withdrawn through the plate 22 and the dough 30 is stripped away from the cutters to rest on the belt 28. Each die 13 contains a wafer of dough 67 held in the serrated edges 68 (see Figs. 10a and 12). The ram 8 is completely withdrawn and held in the withdrawn position until again actuated, as described above, for a second cutting cycle.

The cams 90 and 91 on their continued rotation will actuate the switches 93 and 94 and actuate the valves 95 and 96 only when the interlock cam 98 and the cycle cam 99 actuate the switches 100 and 101, as will be described below.

After the cutter is withdrawn, as a result of the upward movement of the ram 8, the cutter carriage cam 78 has moved off of the cam follower to open the switch 79, thus actuating the valve 80 to introduce air into the other end of the carriage cylinder 31, to cause the ram 32 to be extended to move the rails 14 to the left into the position B', and the second wafer of dough is introduced in the manner similar to the first wafer, as previously described, the cutting of the first wafer being accomplished in the manner described for the second wafer of dough. Assuming that more than one wafer is to be introduced into each can, as for example, ten wafers, this cycle is repeated ten times, the operation of the machine for each wafer cycle being the same. It will be noted that because of the free floating action of the tubes 53, they will adjust themselevs in the can depending on the number of wafers in the can (see Fig. 10a), the compaction of the dough being controlled by the magnitude of the weight 58. On the completion of the introduction of the last, or tenth wafer, for example, depending on the gear ratio of gear train 105, the cam 98 contacts its cam follower to close switch 100.

When both filling stations A' and B' are employed, cam 99 is not employed and switch 101 remains closed. The function of cam 99 will be described below. The closing of the switch 100 closes the circuit, permitting switches 93 and 94 to function. As the plunger carrier plate 55 has been moved upward after the introduction of the tenth wafer, the can carriage cam 90 actuates the cam follower 90 to close the switch 93, to open the valve 95, to actuate the cylinder 45, to extend the ram 44 into the position shown in Fig. 7. This withdraws the fork 43 to remove the fork from the nest of cans 72 (see Figs. 6 and 7). Upon the extension of 44 the can carriage cam 91 actuates the cam follower to close the switch 94, to actuate the valve 96, to actuate the ram 38 of cylinder 39, to move the carriage 35 to the left, as shown in Figs. 8 and 9.

The cam 90 then rides off the cam follower to open the switch 93, to actuate the valve 95, to direct air into the cylinder 45, to withdraw the ram 44. The forks 43 are thus moved into position to embrace the group of cans on the belt 48 positioned immediately ahead of the plate 47 (see Figs. 8 and 9). Simultaneously with this action, as the fork 43 has arrived in the position to move to embrace the next group of cans the right-hand fork 43 is in line with the ram 63 (see Fig. 8). As the ram 44 is retracted to move the forks into position to embrace the group of cans, it abuts the rod 63 and pushes the rod into the cylinder 64 (see Fig. 8). No pressure is exerted in 64 to oppose this motion due to the fact that the valve 97 is in position to bleed the pressure in 64 to atmosphere through line 97a and to close 64 to the compressor. The fork moves in until the roller 44' mounted underneath 43' abuts the rail 34'. The cam 91 has then ridden off of the cam follower to open the switch 94, thus directing air into the cylinder 39 to retract the ram 38. As the carriage 35 moves to the right, the roller 44' is held against the rail 34'. The fork 43 is off the rod 63, and the cam 92 has moved into position to actuate the mechanical connection 102. As the fork approaches the filling position, the roller 44' rolls off the rail 34' along the arcuate end 45' and the pressure in 45 holds the roller 44' against the rail 34 at the end of the fork travel. After a time sufficient to permit the carriage 35 to move the group of cans off the belt 48 onto the plate 47, the cam 92 actuates the mechanical connection 102 to move the valve 97 to connect the cylinder 64 to the source of pressure. The ram 63 is moved into the position shown in Fig. 6 to hold the cans 72 from moving as the belt 48 continues in motion. The continued motion of the carriage 35 moves the nest of cans into position at station A' for the following filling operation. The motion of the cans also moves the nest of cans filled in the preceding operation off of the plate 47 by the fork 43 onto the continuation of the belt 48 (see Fig. 1) to make room for the cans embraced in the fork.

As the cans embraced in the fork enter onto plate 47 they are moved along rails 103 and 104 to hold the nest in position for registration with the plungers. The cans are now ready for a second cycle of filling. It will be observed that during the travel of the fork, the cans are loosely nested, and when delivered to the filling station are locked in position for filling by the rails 104 and the forks.

The sequence of operations described above occurs at stations A' and B', the station A' not being employed while station B' is being filled, and station B' not being employed while station A' is being filled.

Thus it will be seen that there are two filling stations and two cutters A and B; while B is discharging into the cans at station B' the cutter A is being actuated to cut the dough. Then the timing mechanism moves the cutter A into the position for discharge at station A' while the cutter B has been moved into position at the cutting station for cutting operations. The cams which control the motion of B and the cutting and package filling operations associated with the cutter B have been described above. A second set of cams, switches and controls are provided.

The cutter ram 8 is actuated for operation in connection with the cutter assembly A in the manner described above in connection with cutter assembly B by provision of a parallel valve 84' actuated by a switch 88' and a cam 87' so arranged that while valve 84' is open valve 84 is closed, valve 84' being open during that portion of the cutting cycle of assembly A corresponding to the previously described operation of the ram 8 and valves 84 in connection with cutter B.

Only one cam is provided to actuate the cylinder 31 to translate the cutter carriage assembly as indicated by cam 78, switch 79 and valve 80.

The operation at the filling station is provided for by providing a series of cams and switches which correspond to like cams, switches and valves described in connection with the operation of the ejector ram 59, valve 76, can feed carriage rams 38 and 44 and the can feed stop 63 for station B'. A like set of rams, and corresponding switches and valves, are provided to actuate like rams and manifold valve for the ejector blower at the station A'. These valves and the cams and switches associated therewith are numbered with prime numbers on Fig. 14 to correspond to the unprimed numbers of the companion cams, switches and valves which actuate the corresponding rams and ejector blower valve at the station A'. The cams are so mounted that when the cutter assembly B is at the filling station B' and the cutter assembly A is at the cutting station, the switches and valves associated with the filling operation at station A' are in the inactive position. At the same time the corresponding switches and valves function as described above in connection with the filling operation at station B' when the cutter A is moved to the filling station A'; the corresponding switches and valves are actuated in the manner described for station B' to complete the same sequence of operations in connection with the cutter assembly A at the filling station A'.

The cans 72 at the filling stations (see Fig. 6) are arranged in an hexagonal arrangement. The position of the forks at a 60° angle to the axis of the conveyor belt 48 permits the forks to enter between the cans without crushing the cans to segregate a group of cans, thus presenting a group of cans with the rank of cans at the above angle of the forks to the axis of the belt 48. The cutters 13 are arranged in a like arrangement in the cutter plate 12 with the rank and file at the above angle, as seen in Fig. 3, thus permitting the cutters 13, when moved into position, one cutter axially aligned with one can 72 of the group at the filling station.

This also results in an arrangement of the gang of cutters in the cutter plate 12 such that there is a minimum of waste of dough, the wafers being staggered and nested with respect to the axis of the dough sheet (see Fig. 3).

It will be seen from the above description that the direction of reciprocation of the forks and the cutter assemblies are at 60° to the line of advance of the cans and dough sheet.

The above description while illustrating a preferred embodiment of my invention, may be altered, as will be understood by those skilled in this art. Thus, instead of positioning the rails 18, angles 14, and beams 7 at the above angle, the angular position may be changed, as may also the particular angle of the forks.

Instead of employing both filling stations, one may be deactivated, as may also the corresponding cutter assembly. This may be desired either because the production is desired to be cut in half or because of some defect at one of the filling stations, without interrupting the operation of the machine entirely. Thus, if only filling station B' is desired to be used, then the cam followers of cams 87', 69', 90', 91' and 74' are disconnected from the corresponding switches 88', 70', 93', 94' and 74' and the mechanical connection 102 is interrupted. Thus the valves 84', 89', 71', 95', 96', 76' and 97' remain closed.

The cutter assembly B reciprocates between the cutting station and the filling station B' for the number of cycles sufficient to introduce the desired number of wafers into the can 72. Then on the next cycle, for example, the eleventh cycle, if ten wafers are introduced into the can, the belt 28 is permitted to advance during a portion of the cycle sufficient to move a new section of dough into the cutting station. In order not to waste dough, the further advance of the dough until the completion of the return of the cutter assembly B to the cutting station and the cutting operation by assembly B, is assured by stopping the belt 28 during this portion of the cycle. This is accomplished by means of the cam 99 which opens switch 101 and stops the drive motor for conveyor belt 28 during this portion of the cycle (see Fig. 14).

If desired, the station A' and cutter A may be entirely omitted, omitting the associated control and timing devices, if the production from one cutter and one filling station will be sufficient.

While I have described a particular embodiment of my invention for the purpose of illustration, it should be understood that various modifications and adaptations thereof may be made within the spirit of the invention as set forth in the appended claims.

I claim:

1. A machine for cutting wafers of dough and filling said wafers into cans, which comprises means for advancing a sheet of dough to a cutting station, a cutter assembly at said station, a gang of cutters carried in said cutter assembly, means for pressing said cutters into said dough and for retracting said cutter assembly from said dough and carrying a wafer of dough in each cutter of said gang of cutters, means for reciprocating said cutter assembly back and forth between said cutter station and an adjacent filling station, means for positioning a plurality of cans at said filling station, means for positioning said cutter assembly at said filling station with each cutter of said gang of cutters axially aligned with one of said cans, plunger means to discharge said wafers from each of said cutters into the cans axially aligned therewith, and means for maintaining said cans in fixed positions at said filling station until said cutter assembly has reciprocated a plurality of times from said cutting station to said filling station and each of said cans has received a plurality of said wafers from its corresponding cutters.

2. In the machine of claim 1, said plunger means comprising a carrier frame position at said filling station, a plurality of freely movable tubes mounted in said frame, means to move said frame up and down to carry said tubes therewith, a plunger mounted at the end of each of said tubes, said plungers being in substantially the same horizontal plane, said tubes and plungers being axially aligned with said cans of said group of cans positioned at said filling station, said tubes forcing said wafers from said cutters under the weight of said tubes into said cans, and discharging said wafers at substantially the same height within said cans, means for maintaining a vacuum in said tubes while said tubes are forcing said wafers from said cutters into said cans, and means for creating a positive pressure in said tubes when said tubes have entered said cans to place said wafers in said cans, and means for lifting said frame to lift said tubes from said cans.

3. A machine for cutting wafers of dough and filling said wafers into cans, which comprises means for advancing a sheet of dough to a cutting station, a cutter assembly at said station, a gang of cutters carried in said cutter assembly, means for pressing said cutters into said dough and for retracting said cutter assembly from said dough and carrying a wafer of dough in each cutter of said gang of cutters, means for moving said cutter assembly from said cutter station to an adjacent filling station, means for positioning a plurality of cans at said filling station, means for positioning said cutter assembly at said filling station with each cutter of said gang of cutters axially aligned with one of said cans, plunger means to discharge said wafers from each of said cutters into the can axially aligned therewith, means for maintaining said cans in position at said filling station until each of said cans has received a plurality of wafers from said cutters, means to move said cutter assembly from said filling station back to said cutting station in cycles of operation, and means after a predetermined number of cycles to move said group of cans from said filling station and to move a second group of cans to said filling station during the time interval that said cutter is moving from said filling station to said cutting station and from said cutting station back to said filling station.

4. In the machine according to claim 3, means for interrupting advance of said dough during said last named motion of said cutter assembly during the withdrawal of the filled cans from said filling station.

5. A machine for cutting and packaging wafers of dough, which comprises a cutting station, belt means for advancing a sheet of dough to said cutting station, belt means parallel to said first named dough belt means for advancing groups of cans to filling stations positoned one on each side of said cutter station, a pair of cutter assemblies, each assembly comprising a gang of cutters spaced from each other, means for reciprocating said cutter assemblies, one cutter assembly moving between said cutter station and one of said filling stations and the other cutter assembly simultaneously moving between said cutter station and the other of said filling stations, means for forcing said cutters at said cutter station into said dough, and means for retracting said cutters from said dough, said cutters each carrying a dough wafer during said motion between said cutting station and said filling station, means for alternately positioning one of said cutter assemblies at one of said filling stations, said means also thereafter positioning the other of said cutter assemblies at the other of said filling stations, said cutters at said filling stations being axially aligned with said cans at each filling station, and means to move said dough wafers from said cutters and position the said wafers in said cans axially aligned with said cutters.

6. In the machine of claim 5, said last named means comprising a carrier frame positioned at said filling station, a plurality of freely movable tubes mounted in said frame, means to move said frame up and down to carry said tubes therewith, a plunger mounted at the end of each of said tubes, said tubes and plungers being axially aligned with said cans of said group of cans positioned at said filling station, said tubes forcing said wafers from said cutters under the weight of said tubes into said cans, means for maintaining a vacuum in said tubes while said tubes are forcing said wafers from said cutters into said cans, and means for creating a positive pressure in said tubes when said tubes have entered said cans to place said wafers in said cans, and means for lifting said frame to lift said tubes from said cans.

7. In the machine of claim 5, means for alternately moving each of said cutters from the cutting station to said filling station in cycles of operation, and means after a predetermined number of cycles for each filling station and each cutter to move said cans from said filling station and to place a second group of cans at said filling station during the time interval that the cutter assembly associated with said filling station is moving from said filling station to said cutter station and back to said filling station.

8. In a machine for filling cans with wafers of dough, which comprises a filling station, means for positioning a group of cans at said filling station, a cutter assembly composed of a group of cutter dies, means for forcing said cutter assembly into a sheet of dough, means for withdrawing said cutter assembly from said sheet of dough, each of said cutters carrying a wafer of dough, means for positioning said cutter assembly at said filling station, each of said cutters axially aligned with a can of said group of cans, a carrier frame positioned above said cutter assembly at said filling station, a plurality of freely movable tubes mounted in said frame, means to move said frame up and down to carry said tubes therewith, a plunger mounted at the end of each of said tubes, said plungers being in substantially the same horizontal plane, said tubes and plungers being axially aligned with said cans of said group of cans positioned at said filling station, said tubes forcing said wafers from said cutters under the weight of said tubes into said cans, and discharging said wafers at substantially the same height within said cans, means for maintaining a vacuum in said tubes while said tubes are forcing said wafers from said cutters into said cans, and means for creating a positive pressure in said tubes when said tubes have entered said cans to place said wafers in said cans, said means to move said frame lifting said frame to lift said tubes from said cans, and means for maintaining said cans in position at said filling station until each of said cans has received a plurality of wafers from said cutters.

9. In the machine of claim 8, means for moving said cutting assembly from said filling station to a cutting station and back to said filling station in cycles of operation for a predetermined number of cycles, and means for withdrawing said group of cans from said filling station and positioning a second group of cans at said filling station.

10. In a machine for filling cans with wafers of dough, which comprises a conveyor for advancing a sheet of dough to a cutter station, a filling station positioned at one side of said conveyor, means for supplying a group of cans at said filling station, a cutter assembly composed of a group of cutter dies, means for forcing said cutter assembly into a sheet of dough on said conveyor, means for withdrawing said cutter assembly from said sheet of dough, each of said cutters carrying a wafer of dough, means for moving said cutter assembly in a direction at an acute angle to the line of advance of said conveyor means for positioning said cutter assembly at said filling station, each of said cutters axially aligned with a can of said group of cans, a carrier frame positioned above said cutter assembly at said packaging station, a plurality of freely movable tubes mounted in said frame, said carrier frame positioned at said packaging station and means to move said frame up and down to carry said tubes therewith, a plunger mounted at the end of each of said tubes, said tubes and plungers being axially aligned with said cans of said group of cans positioned at said filling station, said tubes forcing said wafers from said cutters under the weight of said tubes into said cans, means for maintaining a vacuum in said tubes while said tubes are forcing said wafers from said cutters into said cans, and means for creating a positive pressure in said tubes when said tubes have entered said cans to place said wafers in said cans, means for lifting said frame to lift said tubes from said cans, a positioning plate at said filling station on which said group of cans may be positioned, said can supplying means comprising conveyor belt means for advancing cans towards said positioning plate and away from said positioning plate, a stop means to hold said cans on said belt means ahead of said positioning plate, a fork, said fork having tines extending parallel to the direction of reciprocation of said cutter assembly, said tines embracing a group of said cans, means for holding said fork on said plate during the said cycle of operation, means for withdrawing said fork from said plate and said group of filled cans in a direction parallel to said tines, means for moving said fork back in a direction opposite to the advance of said filled cans, means for advancing said tines parallel to said direction and embracing a group of empty cans positioned on said belt ahead of said positioning plate, means for moving said fork in the direction of motion of said belt to move said group of cans onto said positioning plate, and means to move said stop means to position to hold the following empty cans frm advancing onto said positioning plate.

11. A machine for cutting and packaging wafers of dough, which comprises a cutting station, means for advancing a sheet of dough to said cutting station, means for advancing groups of cans to filling stations positioned one on each side of said cutter station, a pair of cutter assemblies, each assembly comprising a gang of cutters spaced from each other, means for alternately reciprocating each of the respective cutter assemblies from said cutter station, one cutter assembly to one of said filling stations and then the other cutting assembly to the other of said filling stations, and each cutter assembly back to said cutter station, means for forcing said cutters at said cutter station into said dough and for retracting said cutters from said dough with said cutters each containing a dough wafer, means for alternately positioning one of said cutter assemblies at one of said filling stations and thereafter positioning the other of said cutter assemblies at the other of said filling stations, said cutters at said filling stations being axially aligned with said cans at each filling station, and means while said respective cutter assemblies are positioned at said respective filling stations to move said wafers from said cutters and position said wafers in said cans axially aligned with said cutters.

12. In a machine for filling cans with wafers of dough, which comprises a filling station, means for positioning a group of cans at said filling station, a cutter assembly composed of a group of cutter dies, means for forcing said cutter assembly and dies into a sheet of dough, means for withdrawing said cutter assembly and dies from said sheet of dough, each of said cutters carrying a wafer of dough, means for positioning said cutter assembly at said filling station, each of said cutters axially aligned with a can of said group of cans, a carrier frame positioned above said cutter assembly at said filling station, a plurality of freely movable tubes mounted in said frame, means to move said frame up and down to carry said tubes therewith, a plunger mounted at the end of each of said tubes, said tubes and plungers being axially aligned with said cans of said group of cans positioned at said filling station, said tubes forcing said wafers from said cutters under the weight of said tubes into said cans, means for maintaining a vacuum in said tubes while said tubes are forcing said wafers from said cutters into said cans, means for creating a positive pressure in said tubes when said tubes have entered said cans to place said wafers in said cans, said means to move said frame lifting said frame to lift said tubes from said cans, means for moving said cutting assembly from said filling station to a cutting station and back to said filling station in cycles of operation for a predetermined number of cycles, means for withdrawing said group of cans from said filling station and positioning a second group of cans at said filling station, said last named means comprising a positioning plate on which said group of cans may be positioned, conveyor belt means for advancing cans toward said positioning plate and away from said positioning plate, a stop means to hold said cans on said belt means ahead of said positioning plate, a fork, said fork embracing a group of said cans, means for holding said fork on said plate during the said cycle of operation, means for withdrawing said fork from said plate and said group of filled cans, means for moving said fork back in a direction opposite to the advance of said filled cans, means for moving said fork towards said cans and embracing a group of empty cans positioned on said belt ahead of said positioning plate, means for moving said fork in the direction of motion of said belt to move said group of cans onto said positioning plate, and means to move said stop means into position to hold the following empty cans from advancing onto said positioning plate.

13. A machine for cutting and packaging wafers of dough, which comprises a cutting station, belt means for advancing a sheet of dough to said cutting station, belt means parallel to said first named dough belt means for advancing groups of cans to a filling station, means for moving said cutter assembly from said cutter station to said filling station and back to said cutter station, means for positioning said cutter assembly in said filling station with each cutter of said gang of cutters axially aligned with one of said cans, a carrier frame positioned at said filling station, a plurality of depending plungers mounted on said carrier frame, said plungers being in substantially the same horizontal plane and axially aligned with said group of cans positioned at said filling station, means for moving said plungers downwardly and forcing said wafers from said cutter assembly into said cans and discharging said wafers at substantially the same height in said cans, means for maintaining said cans in fixed position at said filling station until each of said cans has been filled with a plurality of wafers one atop the other following a plurality of the aforementioned cycles, and means for removing said filled cans from said filling station.

References Cited in the file of this patent

UNITED STATES PATENTS

| | | |
|---|---|---|
| 1,653,402 | Kaser | Dec. 20, 1927 |
| 2,283,298 | Thum | May 19, 1942 |
| 2,612,853 | Bale | Oct. 7, 1952 |
| 2,664,883 | Armstrong et al. | Jan. 5, 1954 |
| 2,707,922 | Ferguson et al. | May 10, 1955 |